US010819706B2

(12) United States Patent
Russell

(10) Patent No.: US 10,819,706 B2
(45) Date of Patent: Oct. 27, 2020

(54) SYSTEM, APPARATUS AND METHOD FOR FACILITATING REMOTE GAMING COMMUNICATIONS IN A VENUE

(71) Applicant: IGT, Las Vegas, NV (US)

(72) Inventor: Peter Russell, London (GB)

(73) Assignee: IGT, Las Vegas, NV (US)

(*) Notice: Subject to any disclaimer, the term of this patent is extended or adjusted under 35 U.S.C. 154(b) by 288 days.

(21) Appl. No.: 16/029,714

(22) Filed: Jul. 9, 2018

(65) Prior Publication Data
US 2020/0014683 A1    Jan. 9, 2020

(51) Int. Cl.
H04L 29/06    (2006.01)
H04W 12/06   (2009.01)
G07F 17/32    (2006.01)
G06Q 30/02    (2012.01)
H04W 12/08   (2009.01)

(52) U.S. Cl.
CPC ..... *H04L 63/0846* (2013.01); *G06Q 30/0261* (2013.01); *G07F 17/329* (2013.01); *H04W 12/06* (2013.01); *H04W 12/08* (2013.01)

(58) Field of Classification Search
CPC ............ H04L 63/0846; G06Q 30/0261; G07F 17/329; H04W 12/06; H04W 12/08
USPC .......................................................... 726/6
See application file for complete search history.

(56) References Cited

U.S. PATENT DOCUMENTS

| | | | |
|---|---|---|---|
| 5,875,394 A * | 2/1999 | Daly | ..................... H04W 12/06 455/411 |
| 6,846,238 B2 | 1/2005 | Wells | |
| 6,899,621 B2 | 5/2005 | Behm et al. | |
| 7,040,987 B2 | 5/2006 | Walker et al. | |
| 7,621,810 B2 | 11/2009 | Gilmore et al. | |
| 7,685,629 B1 * | 3/2010 | White | ................ G06Q 20/3674 726/2 |
| 7,811,172 B2 | 10/2010 | Asher et al. | |
| 7,883,417 B2 | 2/2011 | Bruzzese et al. | |
| 8,162,738 B2 | 4/2012 | Erickson | |
| 8,469,790 B1 | 6/2013 | Itkis et al. | |
| 8,506,395 B2 | 8/2013 | Bytnar et al. | |
| 8,523,669 B1 | 9/2013 | Krietemeyer | |
| 8,523,682 B2 * | 9/2013 | Bickley | .................. G07F 17/32 463/13 |
| 8,602,882 B2 | 12/2013 | Nguyen et al. | |
| 8,878,905 B2 | 3/2014 | Aligizakis et al. | |

(Continued)

FOREIGN PATENT DOCUMENTS

| | | |
|---|---|---|
| WO | WO 2009042190 | 4/2009 |
| WO | WO 2011156475 | 12/2011 |
| WO | WO 2016044798 | 3/2016 |

*Primary Examiner* — Dant B Shaifer Harriman
(74) *Attorney, Agent, or Firm* — Neal, Gerber & Eisenberg LLP

(57) ABSTRACT

A system, apparatus and method are presented for facilitating remote wager communications using a mobile communications device while the device is within range of one or more beacons within a venue. In various embodiments, one or more beacons broadcast a periodically changing wireless passcode that is received by a mobile communications device and transmitted to a gaming authentication server. The gaming authentication server determines a shared secret code and compares it to the wireless passcode or a portion thereof in order to determine if the mobile communications device can be authenticated for remote gaming within the venue.

20 Claims, 4 Drawing Sheets

(56) References Cited

U.S. PATENT DOCUMENTS

| | | | |
|---|---|---|---|
| 8,747,219 B2 | 6/2014 | Wright et al. | |
| 8,758,120 B2 | 6/2014 | Wright et al. | |
| 8,777,732 B2* | 7/2014 | Robbins | G07F 17/3225 463/1 |
| 8,814,683 B2* | 8/2014 | Hollander | G07F 17/3206 463/31 |
| 8,876,608 B2 | 11/2014 | Shepherd et al. | |
| 8,944,916 B2 | 2/2015 | Abouchar et al. | |
| 8,965,416 B2 | 2/2015 | Moshir et al. | |
| 9,039,508 B1 | 5/2015 | Arnone et al. | |
| 9,070,250 B2 | 6/2015 | Kelly et al. | |
| 9,142,086 B2* | 9/2015 | Porco | G07F 17/3237 |
| 9,153,095 B2 | 10/2015 | Adiraju et al. | |
| 9,208,652 B2 | 12/2015 | Aligizakis et al. | |
| 9,218,715 B2 | 12/2015 | Price et al. | |
| 9,317,995 B2 | 4/2016 | Nyman et al. | |
| 9,367,990 B2 | 6/2016 | Carter | |
| 9,373,116 B1 | 6/2016 | Kerr | |
| 9,396,376 B1* | 7/2016 | Narayanaswami | G06K 19/06056 |
| 9,467,222 B1 | 10/2016 | Pollmann et al. | |
| 9,679,437 B2 | 6/2017 | Detlefsen et al. | |
| 9,965,768 B1* | 5/2018 | Doane | G06Q 30/0251 |
| 1,013,419 A1 | 11/2018 | Lyons et al. | |
| 10,225,873 B2 | 3/2019 | Menon | |
| 2001/0046891 A1 | 11/2001 | Acres | |
| 2003/0014247 A1* | 1/2003 | Ng | G10L 17/06 704/209 |
| 2003/0064805 A1 | 4/2003 | Wells | |
| 2003/0065805 A1 | 4/2003 | Barnes, Jr. | |
| 2003/0148812 A1 | 8/2003 | Paulsen et al. | |
| 2003/0224852 A1 | 12/2003 | Walker et al. | |
| 2004/0046017 A1* | 3/2004 | Sueyoshi | G07F 7/1008 235/382 |
| 2004/0085293 A1 | 5/2004 | Soper et al. | |
| 2004/0137987 A1 | 7/2004 | Nguyen et al. | |
| 2004/0209690 A1 | 10/2004 | Bruzzese et al. | |
| 2004/0259626 A1 | 12/2004 | Akram et al. | |
| 2005/0054438 A1 | 3/2005 | Rothschild et al. | |
| 2005/0059485 A1 | 3/2005 | Paulsen et al. | |
| 2005/0130728 A1 | 6/2005 | Nguyen et al. | |
| 2005/0181875 A1 | 8/2005 | Hoehne et al. | |
| 2005/0213790 A1 | 9/2005 | Rhoads et al. | |
| 2006/0035707 A1 | 2/2006 | Nguyen et al. | |
| 2006/0189382 A1 | 8/2006 | Muir et al. | |
| 2007/0042823 A1 | 2/2007 | Shim | |
| 2007/0054738 A1 | 3/2007 | Muir | |
| 2007/0083750 A1* | 4/2007 | Miura | G06F 21/445 713/155 |
| 2007/0117609 A1 | 5/2007 | White et al. | |
| 2007/0135202 A1 | 6/2007 | Linard et al. | |
| 2007/0157291 A1* | 7/2007 | Chua | H04L 9/3213 726/4 |
| 2007/0293293 A1 | 12/2007 | Baerlocher et al. | |
| 2008/0039197 A1 | 2/2008 | Walker et al. | |
| 2008/0058065 A1 | 3/2008 | Okada | |
| 2008/0076528 A1 | 3/2008 | Nguyen et al. | |
| 2008/0076572 A1 | 3/2008 | Nguyen et al. | |
| 2008/0096628 A1 | 4/2008 | Czyzewski et al. | |
| 2008/0108435 A1 | 5/2008 | Nelson et al. | |
| 2008/0194323 A1 | 8/2008 | Merkli et al. | |
| 2008/0214166 A1 | 9/2008 | Ramer et al. | |
| 2008/0220878 A1 | 9/2008 | Michaelis | |
| 2008/0261682 A1 | 10/2008 | Phillips et al. | |
| 2008/0268934 A1 | 10/2008 | Mattice et al. | |
| 2008/0318655 A1 | 12/2008 | Davies | |
| 2009/0006861 A1* | 1/2009 | Bemmel | G06F 21/445 713/189 |
| 2009/0040370 A1 | 2/2009 | Varanasi | |
| 2009/0088243 A1 | 4/2009 | Gagner et al. | |
| 2009/0124376 A1 | 5/2009 | Kelly et al. | |
| 2009/0187463 A1 | 7/2009 | DaCosta | |
| 2009/0197684 A1 | 8/2009 | Arezina et al. | |
| 2009/0203448 A1 | 8/2009 | Lupo et al. | |
| 2009/0247287 A1 | 10/2009 | Voutes | |
| 2009/0264190 A1 | 10/2009 | Davis et al. | |
| 2009/0265105 A1 | 10/2009 | Davis et al. | |
| 2010/0016052 A1 | 1/2010 | Gagner et al. | |
| 2010/0048291 A1 | 2/2010 | Warkentin | |
| 2010/0062840 A1 | 3/2010 | Herrmann | |
| 2010/0113161 A1 | 5/2010 | Walker et al. | |
| 2010/0227662 A1 | 9/2010 | Speer, II et al. | |
| 2010/0255912 A1 | 10/2010 | Ward | |
| 2010/0257252 A1 | 10/2010 | Dougherty et al. | |
| 2010/0323785 A1 | 12/2010 | Motyl et al. | |
| 2011/0029399 A1 | 2/2011 | Asher et al. | |
| 2011/0035788 A1* | 2/2011 | White | H04L 9/3231 726/4 |
| 2011/0130197 A1 | 6/2011 | Bytnar et al. | |
| 2011/0159940 A1 | 6/2011 | Acres | |
| 2011/0159948 A1 | 6/2011 | Anderson et al. | |
| 2011/0183732 A1 | 7/2011 | Block et al. | |
| 2011/0183749 A1 | 7/2011 | Allen et al. | |
| 2011/0238482 A1* | 9/2011 | Carney | G06F 21/6245 705/14.36 |
| 2011/0292076 A1 | 12/2011 | Wither et al. | |
| 2011/0306400 A1 | 12/2011 | Nguyen | |
| 2012/0015735 A1 | 1/2012 | Abouchar et al. | |
| 2012/0028714 A1 | 2/2012 | Gagner et al. | |
| 2012/0089468 A1 | 4/2012 | Guziel | |
| 2012/0214582 A1 | 8/2012 | Marek | |
| 2012/0265988 A1* | 10/2012 | Ehrensvard | G06F 21/572 713/165 |
| 2012/0289313 A1 | 11/2012 | Anderson et al. | |
| 2012/0295696 A1 | 11/2012 | Anderson et al. | |
| 2012/0295697 A1 | 11/2012 | Anderson et al. | |
| 2012/0302326 A1 | 11/2012 | Anderson et al. | |
| 2013/0035149 A1 | 2/2013 | Oakes | |
| 2013/0102394 A1 | 4/2013 | Seitz et al. | |
| 2013/0260882 A1 | 10/2013 | Hamlin et al. | |
| 2013/0337890 A1 | 12/2013 | Earley et al. | |
| 2014/0045586 A1 | 2/2014 | Allen et al. | |
| 2014/0082707 A1* | 3/2014 | Egan | H04L 63/0853 726/5 |
| 2014/0108084 A1* | 4/2014 | Bargetzi | H04L 63/105 705/7.19 |
| 2014/0141864 A1 | 5/2014 | Ward et al. | |
| 2014/0200075 A1 | 7/2014 | Krietemeyer | |
| 2014/0315571 A1* | 10/2014 | Saari | H04W 48/02 455/456.1 |
| 2014/0370959 A1 | 12/2014 | Yacenda | |
| 2014/0878219 | 12/2014 | Arnone et al. | |
| 2015/0050988 A1 | 2/2015 | Nichols et al. | |
| 2015/0194013 A1 | 7/2015 | Herold | |
| 2015/0265915 A1 | 9/2015 | Nelson et al. | |
| 2016/0036087 A1* | 2/2016 | Na | B32B 37/12 156/306.6 |
| 2016/0036807 A1* | 2/2016 | Knauss | G06F 21/42 726/7 |
| 2016/0055709 A1 | 2/2016 | Amaitis et al. | |
| 2016/0093135 A1 | 3/2016 | Bond et al. | |
| 2016/0093156 A1 | 3/2016 | Aligizakis et al. | |
| 2016/0117885 A1* | 4/2016 | Shuster | G07F 17/3223 463/17 |
| 2016/0155300 A1 | 6/2016 | Mound | |
| 2016/0259955 A1* | 9/2016 | Berlin | G06K 7/10415 |
| 2017/0011380 A1 | 1/2017 | Govindarajan et al. | |
| 2017/0163617 A1* | 6/2017 | Laxminarayanan | H04L 63/062 |
| 2017/0185991 A1* | 6/2017 | Park | H04W 4/023 |
| 2017/0249634 A1 | 8/2017 | Cage et al. | |
| 2017/0265066 A1* | 9/2017 | Vyas | H04L 5/22 |
| 2018/0063684 A1* | 3/2018 | Cheng | H04W 4/12 |

* cited by examiner

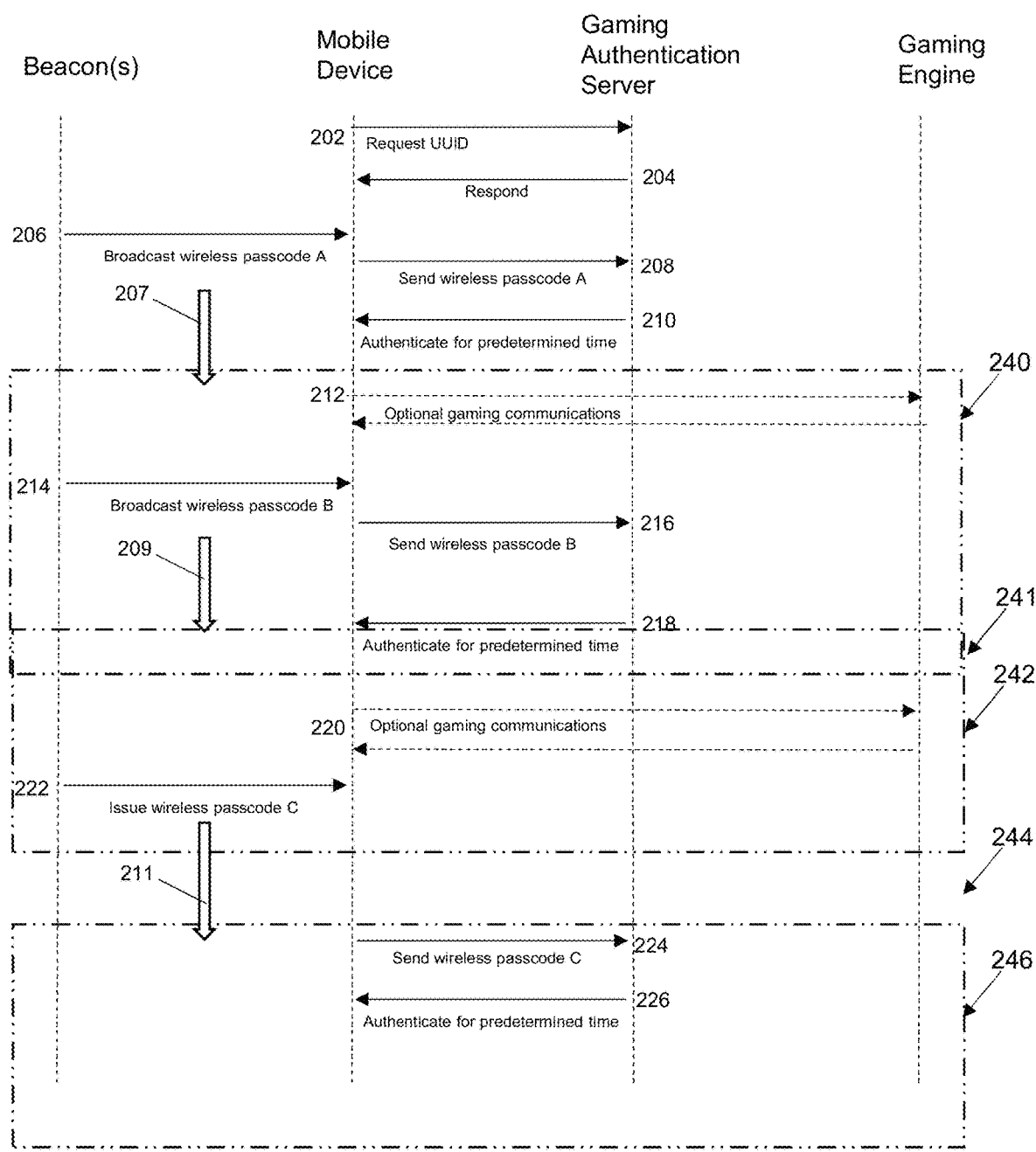

SYSTEM, APPARATUS AND METHOD FOR FACILITATING REMOTE GAMING COMMUNICATIONS IN A VENUE

BACKGROUND

The present disclosure relates generally to gaming and lottery systems, and more particularly to facilitating remote gaming communications in venues.

Many types of lottery and gaming environments exist. For example, traditional lottery tickets offered for drawing games and instant games can be purchased in a traditional retail environment, where players enter a retail establishment that sells the lottery tickets, purchase the ticket(s) and play the ticket(s) according to game rules. In some jurisdictions, Internet or online wager communications are permitted, which allow players to buy tickets in electronic form over a network such as the Internet, for example. In other jurisdictions, players may search for and store desired purchases remotely, such as over the Internet, for example, but must then pay for and/or otherwise conduct the lottery wager transaction within the confines and/or defined territory of an authorized lottery retailer. In still other jurisdictions, remote gaming communications are permitted as long as they are within a defined geographic location, such as a specified gaming venue.

In some cases of remote gaming, players need not appear in person at a retailer terminal, but must be within range of a private network, such as a WiFi or Bluetooth network. Exemplary environments include gas stations, convenience stores and other lottery retail establishments. However, these environments have limitations with respect to wagering communications.

BRIEF SUMMARY

The present disclosure relates generally to a system, apparatus and method for facilitating gaming communications wherein one or more gaming authentication servers and Bluetooth-enabled beacons are provided in a physical establishment. In various embodiments, the Bluetooth-enabled beacons regularly issue specially adapted and frequently changed wireless passcodes. The wireless passcodes permit participating devices to continually authenticate with a gaming authentication server. Mobile communications devices entering into the premises can register with the gaming authentication server and receive a current wireless passcode from one or more beacons, then transmit the current wireless passcode to the gaming authentication server to become authenticated in order to engage in the purchase and/or play of a game. If a previously authenticated device does not receive and timely transmit an updated code to the gaming authentication server, such as when the device is outside of the regulated property or geo-fence, then the previously authenticated device's connectivity for gaming participation will cease.

In various embodiments, a time-based one-time password (TOTP) algorithm generates one-time passwords at the gaming authentication server and at each beacon. The one-time passwords become part of the wireless passcodes issued by the beacons, such that when a mobile device receives a wireless passcode and forwards it to the gaming authentication server, the one-time password is included, allowing the gaming authentication server to authenticate the device and permit play to begin and/or continue.

BRIEF DESCRIPTION OF THE SEVERAL VIEWS OF THE DRAWINGS

FIGS. 3 and 4 are diagrams illustrating exemplary process flows according to embodiments of the present disclosure.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Example embodiments such as disclosed herein can be used to support regulated state or governmental lotteries, private gaming corporations, authorized lottery retailers, and/or other entities that provide legal gaming to customers. While the examples are described principally with reference to regulated gaming applications, it will be appreciated that the same solutions may be applied in other wagering applications or environments. The example embodiments described below include references to a gaming authentication server, a gaming engine, a mobile communications device, communication beacon and a gaming system. Such server, engine, device, beacon and/or system may be implemented as a single computing system or as a collection of computing systems or subsystems which are communicatively coupled, directly or indirectly, and each component or subsystem of the exemplary server, engine, device and/or system can be implemented in hardware, software or a combination thereof. In various embodiments, the system, gaming authentication server, gaming engine, mobile communications device and communication beacon(s) each have a processor and an associated memory storing instructions that, when executed by the processor, cause the processor to perform operations as described herein. It will be appreciated that reference to "a", "an" or other indefinite article in the present disclosure encompasses one or more than one of the described element. Thus, for example, reference to a processor encompasses one or more processors, reference to a memory encompasses one or more memories, reference to a gaming authentication server encompasses one or more gaming authentication servers and so forth.

Figure 1:
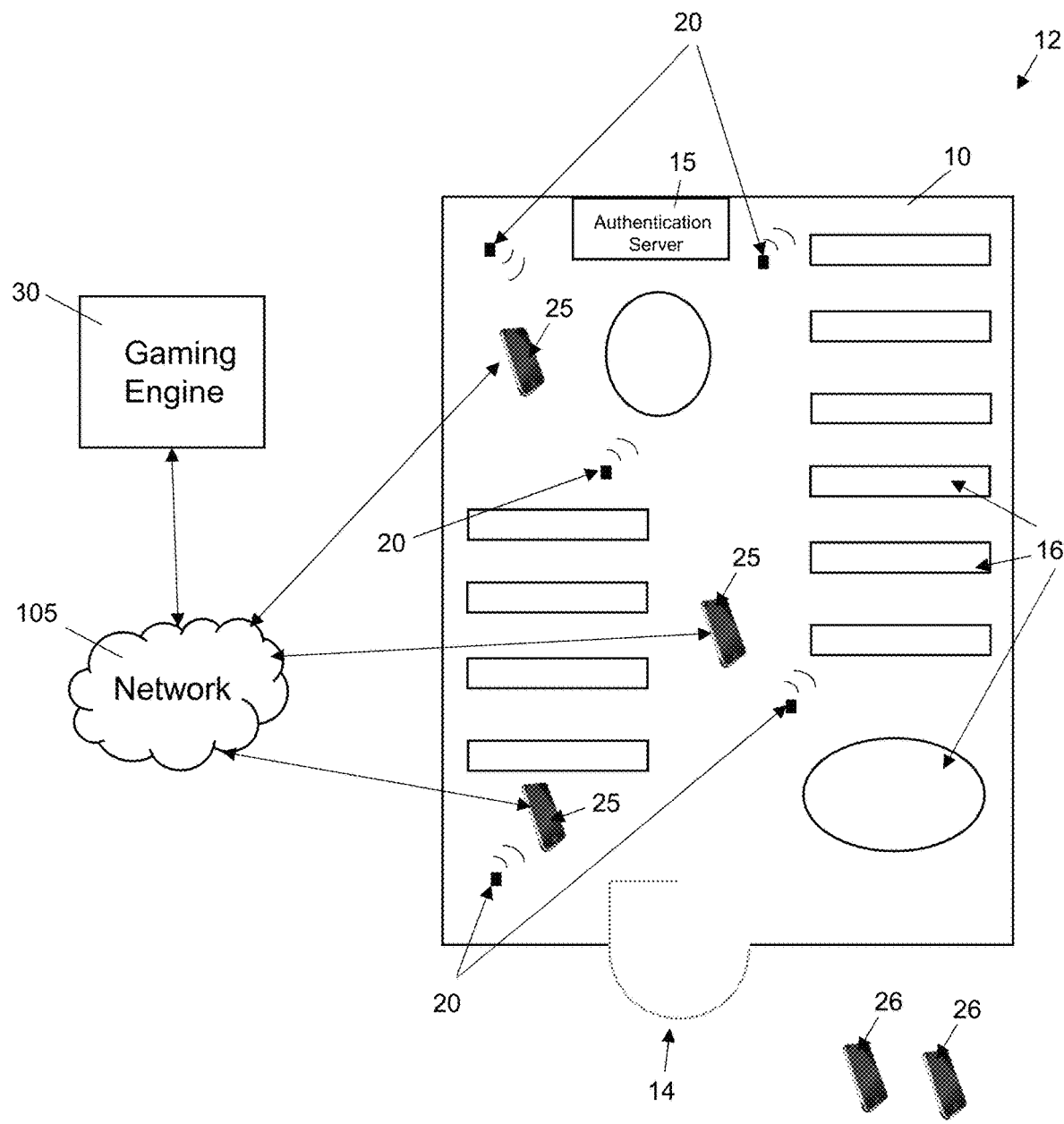
FIG. 1 is a schematic diagram of an exemplary system in accordance with the present disclosure.

As shown in FIG. 1, an exemplary regulated gaming venue 10 is provided with a system 12 for facilitating remote gaming communications having at least one gaming authentication server 15 and at least one beacon 20. It will be appreciated that embodiments of the system 12 can operate with the gaming authentication server(s) residing within the venue 10 or residing outside of and/or away from the venue 10. The gaming venue 10 may be, for example, an indoor casino facility having an entrance 14 and various structures such as gaming tables or gaming machines (shown generally at 16) to serve customers. Beacons 20 can be placed in strategic positions throughout the venue and create a "halo" of authentication for any device, such as a mobile communications device 25, that can pick up a wireless passcode issued from the beacon 20. This facilitates gaming and/or wagering to occur via the mobile communications devices 25 such that in-person participation at a gaming table or gaming machine is not required. In various embodiments, physical security measures can be implemented by placing each beacon 20 in an out-of-reach location in a non-descript housing securely fastened to a structural point in the regulated venue, for example. Administrators can appropriately attenuate, direct or block each beacon's signal so as to ensure issued signals are contained within the venue 10. For example, a beacon 20 near a corner of the regulated venue may be adjusted to have a weaker signal then a beacon 20 in the center of the regulated venue 10, as the signals from the beacon near the corner may be received from outside of the venue 10 if the signal is too strong. Alternatively, the signal from a beacon 20 near the perimeter of the venue 10 may have its signal directed away from the perimeter or blocked so it does not transmit beyond the perimeter. Any device 25 that can read the issued wireless passcode is allowed to use the regulated services provided, for example, by a gaming engine 30. In FIG. 1, mobile communications devices 26 that are outside of the venue 10 are not capable of receiving wireless passcodes from the beacons 20 within the venue 10. Devices 26 outside of the venue 10 may still confirm geolocation, but since they are outside of the venue 10, the gaming authentication server 15 will not be contacted. Further, the beacons 20 are not in communication with the gaming authentication server 15 for security purposes. For example, if a beacon 20 is physically confiscated or somehow compromised, it cannot be used to access the gaming authentication server 15.

The gaming authentication server 15 authenticates mobile communications devices 25 for gaming. In various embodiments such as shown in FIG. 1, the gaming authentication server 15 is located on-site at the venue, which may be required by local regulations and/or may be desirable to ensure consistent and reliable communications with the mobile communications devices 25, such as by a local wireless network, for example. In other embodiments, the gaming authentication server 15 is located off-site and accessible by a private or public network, such as network 35. The gaming engine 30 stores virtual games such as baccarat, roulette, lottery and other games that users of mobile communications devices may desire to play, and can be accessed via a network 35 such as a private network or the Internet, for example. In various embodiments, the gaming engine 30 can be provided as part of, or separate from, the gaming authentication server 15. The gaming authentication server 15, gaming engine 30 and beacons 20 may include and/or be in communication with one or more databases to facilitate operations as described herein, as well as necessary and desired storage of system events, relevant programming and data.

Mobile communications devices 25 can be provided with one or more processors and an associated memory storing instructions that, when executed by the one or more processors, cause the one or more processors to perform operations as described herein. Mobile communications devices 25 can further include input and output mechanisms, including a physical or virtual keypad, a microphone, a display such as a touchscreen display, a speaker, a tactile output generator (e.g., vibration element) and other mechanisms as will be understood. Further, the mobile communications devices 25 generally include one or more device programs, such as system programs and application programs to perform various computing and/or communications operations. System programs may include an operating system, device drivers, programming tools, utility programs, software libraries and application programming interfaces (APIs), for example. Application programs may include messaging applications, a web browser application, media applications, database applications, location-based services applications, authentication applications and gaming and/or wagering applications, for example. Such application programs may provide for displaying various graphical user interfaces (GUIs) to present information to and/or receive information from users of the mobile communications devices 25. For instance, the gaming application may display an appropriate GUI to receive a touchscreen or spoken input from a user when selecting a game to be played or wagered upon, and may further provide another appropriate GUI to display activated games and/or wagers on the mobile devices 25.

The gaming engine 30 is accessible by the mobile communications devices 25 over network 35. The gaming engine 30 includes programming for displaying available wagering games which may be purchased, wherein such purchase constitutes a wager on the game. The gaming engine 30 further includes programming for receiving selections from players via their mobile communications devices 25, including selections of desired types of games to play, selections of specific games to play, selections of game indicia within particular games, selections of numbers of tickets to purchase and selections associated with financial transactions, such as a player account, loyalty points, credit or debit card or other information necessary to process purchase transactions and deposit winnings. In various embodiments, the gaming engine 30 includes programming for facilitating shopping cart processing and related transactions. For example, a player may browse available games for a particular jurisdiction by accessing the gaming engine 30 over the Internet. The player may then desire to purchase one or more certain games, and may place the desired games in a virtual shopping cart through appropriately instructing the gaming engine 30 via a suitable interface. Such an interface can be provided via a wagering application ("app"), as described above, which may be downloaded or otherwise presented on the mobile device 25 in order to facilitate player interactions as described herein. For example, the player may tap on a display screen of their mobile device when the app is running to select a game item to be added to his or her cart, or may swipe the display screen as part of a drag-and-drop approach to adding the desired game item into his or her cart. The player can also log in or otherwise identify himself or herself to the gaming engine 30 so that the player's cart is associated with the player and/or the player's mobile device 25. Such identification can be provided via the player entering a user name and password, a code or other form of identification.

In various embodiments, the beacon(s) 20 can comprise devices such as a Raspberry Pi™ device, developed by the Raspberry Pi Foundation of Cambs, UK, incorporating programming for issuing broadcasts in the form of wireless passcodes as described herein. Typically, a beacon protocol is designed to encourage ease of access and use, such as in a retail environment where a retailer is attempting to notify all local passersby of available commercial offerings. The protocol is not designed to be secure and spoofing or cloning is trivial. Nevertheless, in accordance with the present disclosure, the beacon communication is a periodically changed wireless passcode enabling a mobile communications device 25 to gain temporary access to gaming content once authenticated via the gaming authentication server 15. As such, embodiments of the present disclosure address security issues through periodic changing of broadcasted wireless passcodes and subsequent authentication by the gaming authentication server 15 as described herein.

In various embodiments, each beacon 20 sends a wireless passcode in the form of an information packet. The wireless passcodes conform to an advertisement protocol including a universally unique identifier (UUID), a major advertising value and a minor advertising value, as exemplified in Table 1 below, and these passcodes can be communicated via Bluetooth Low Energy (BLE) communication, for example.

TABLE 1

| Field | Size | Description |
| --- | --- | --- |
| UUID | 16 bytes | A universally unique identifier for identifying a specific venue or gaming premises. |
| Major | 2 bytes | A code for identifying a specific beacon. For example, this can define a sub-region within a larger region defined by the UUID. |
| Minor | 2 bytes | A changing code for permitting temporary access. |

Generally, the UUID, major and minor values are hierarchical in nature, with the major and minor advertising values allowing for subdivision of the identity established by the UUID. A beacon 20 will broadcast its wireless passcode at a defined interval such as every second, for example, and at a defined strength, such as −20 dB, for example. Mobile device applications (i.e., "apps") can instruct the operating system of each mobile communications device 25 to listen for a specific UUID and to alert them whenever a broadcast its received for that given UUID. In various embodiments, an app can list multiple UUIDs for which it wishes to be notified. Thus, if a player plans to spend time in three different casinos and/or gaming venues, his or her mobile communications device 25 can list three UUIDs.

Instead of constantly broadcasting fixed values (UUID, major advertising value, minor advertising value) constituting the wireless passcode, which would allow an unscrupulous person to program his or her own beacon device to advertise the same data and thus play outside of the regulated areas, embodiments of the present disclosure operate whereby the beacons 20 change their wireless passcode on a periodic basis in a predictable yet secure manner. While changing the wireless passcode could be done manually via an administrator device connecting directly to the beacon hardware and sending new values to the beacon, this is not practically feasible. As such, beacon devices according to the present disclosure can be programmed using a protocol such as the advertising protocol from Table 1, implementing a TOTP or similar algorithm on the device and changing the wireless passcode on a regular basis. At the same time, the gaming authentication server 15 includes programming for determining a shared secret code for each beacon to be used in authentication. In this way, each beacon can act as an authentication device, effectively handing out "passes" to mobile communications devices to allow them to be authenticated by the gaming authentication server 15 in order to have access to game play.

As described herein, the beacons generate and broadcast wireless passcodes that change on a periodic basis. Thus, a first wireless passcode permits authentication for a first predetermined time period, a second wireless passcode permits authentication for a second predetermined time period after the first predetermined time period, and so on. The second and subsequent wireless passcodes are different from the first and any previous wireless passcodes, in accordance with various embodiments of the disclosure. The current wireless passcode being broadcasted is the passcode that permits authentication of a mobile communications device at the current time.

Figure 2:
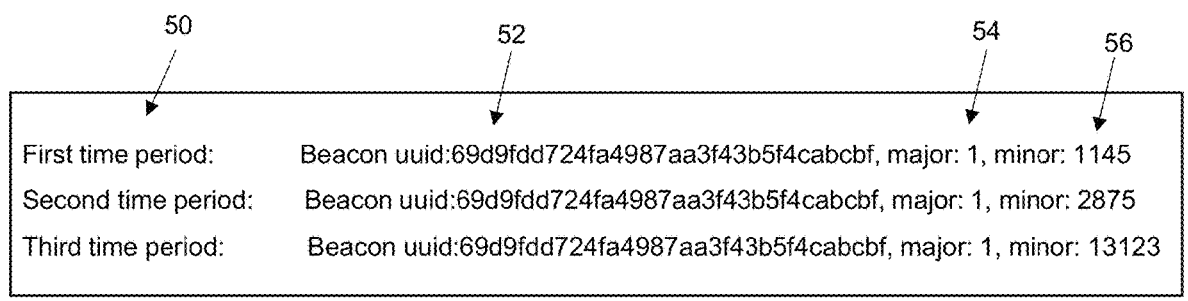
FIG. 2 is a diagram illustrating changing wireless passcodes for multiple beacons according to aspects of the present disclosure.
Figure 2:

FIG. 2 illustrates a series of wireless passcodes and changing minor values for two different beacons. For the first beacon, at different time periods 50, the UUID 52 identifying the venue is the same, the major value 54 identifying the first beacon is the same, and the minor value 56 is different. As described elsewhere herein, the minor value can be generated by applying an algorithm, such as a TOTP algorithm to a seed that may comprise, for example, a secret key and the current time. As a specific example, if the secret key is "4545454" and the current time is 00104508 (corresponding, for example, to 10:45.08 am), the algorithm may combine the seed elements, 4545454 and 00104508, to compute the minor value 56. The gaming authentication server 15 also has a record of the secret key for all beacons, and thus stores and has knowledge of the "4545454" shared secret key in this example. At the time of authentication, the gaming authentication server 15 looks up the shared secret key for the first beacon, and adds the current time as another seed element before applying the same algorithm to the combined seed in order to compute a shared secret code. This shared secret code is compared with the minor value 56 from the wireless passcode in order to authenticate the mobile communications device 25. As time periods change, the actual time seed will change, resulting in a new shared secret code as determined by the gaming authentication server and a new minor value as determined by the beacon.

In similar fashion, for the second beacon, at different time periods 60, the UUID 62 identifying the venue is the same, the major value 64 identifying the beacon is the same, and the minor value 66 is different. Notably, the UUIDs 52 and 62 are the same for both beacons; however, the major values 54, 64 and minor values 56, 66 will be different as to the different beacons. In this way, when the gaming authentication server 15 receives the wireless passcode from a mobile communications device 25, it can use the major value 54 or 64 to look up the respective shared secret key in order to compute the shared secret code for comparison with the minor value from the wireless passcode for the beacon which issued the wireless passcode to the mobile communications device 25. If there is a match, the gaming authentication server 15 authenticates the mobile communications device 25 for temporary gaming play. The temporary gaming play can occur via the gaming engine 30.

Figure 3:
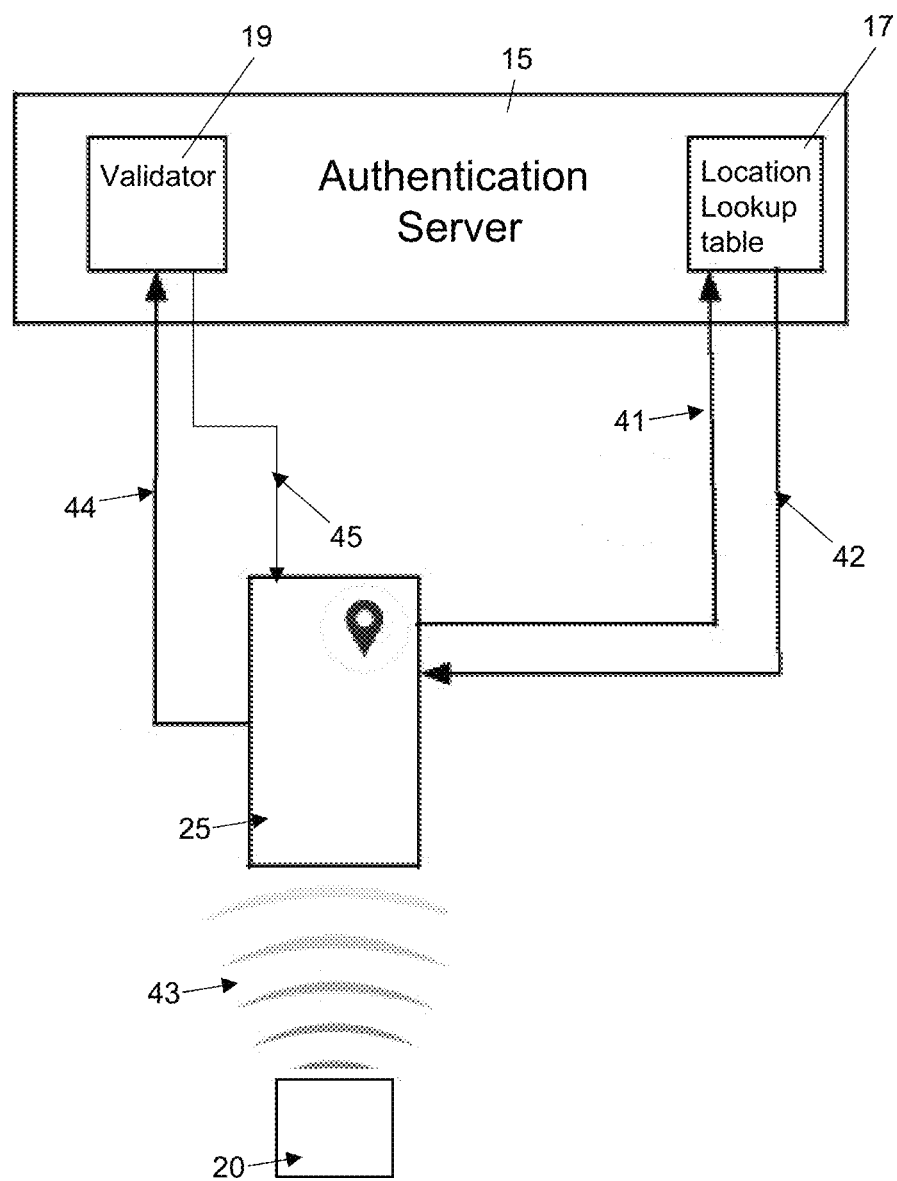

FIG. 3 shows a schematic diagram illustrating how one process according to the present disclosure operates. As shown at 41, a mobile application operating on a user's mobile communications device 25 gathers the UUID from the gaming authentication server 15 for the premises where wagering communications are desired. While GPS and WiFi are generally not sufficient to accurately pinpoint the location of the mobile communications device 25, approximations are generally sufficient to distinguish one regulated venue (e.g., casino) from another. Once the device 25 has an approximate geolocation, it sends this to the gaming authentication server 15 as part of a request for a unique identifier for the venue and the one or more beacons within the venue, as indicated by arrow 41.

The gaming authentication server 15 stores a lookup table 17 for a multitude of regulated gaming areas, so the gaming authentication server can inform the mobile application which regulated environment is appropriate. As indicated by arrow 42, the gaming authentication server 15 issues the unique identifier corresponding to the appropriate regulated environment and an identification of the beacons therein to the mobile communications device 25. In various embodiments, the gaming authentication server 15 also creates and sends a session token to the mobile communications device 25. It will be appreciated that each regulated environment (e.g., casino) has a different UUID for its beacon(s). The mobile communications device 25 registers for that UUID via a mobile application operating on the mobile communications device 25, for example, and waits to receive a broadcast from a beacon within the environment. Thus, with reference back to FIG. 1, if venue 10 has five different beacons 20, the UUID would refer to the venue 10 and the mobile communications device 25 would register for that UUID so it could receive communications from all five beacons 20 within the venue 10.

As indicated by arrow 43 and described elsewhere herein, the beacons 20 in the venue regularly generate and broadcast wireless passcodes. The mobile communications device operating system (OS) can notify the mobile application as soon as it receives one of the wireless passcodes from a beacon within the venue. As illustrated in Table 1 above, the wireless passcode can include a major advertising value and a minor advertising value. In various embodiments, the major advertising value indicates the beacon within the venue from which the wireless passcode was sent, and is static for any given beacon. The minor advertising value indicates a changing code, such as a TOTP token as described elsewhere herein. In various embodiments, a TOTP algorithm is employed, whereby both the beacon(s) and the gaming authentication server create a numeric value using both a shared secret key and the current time. Applying the algorithm to the combined shared secret key and the current time generates the unique numeric value. This unique numeric value becomes the minor value of the wireless passcode when computed by the beacon 20, and becomes the shared secret code when computed by the gaming authentication server 15. After an agreed time period (e.g., one minute), the device authentication expires. If the user of the mobile communications device 25 is still within the authorized area for remote gaming, a new wireless passcode issued by a beacon within the venue will be received by the mobile communications device 25, and this wireless passcode with changed minor value can then be transmitted to the gaming authentication server 15, which then determines a new shared secret code for comparing with the minor value of the wireless passcode.

Thus, as illustrated in FIG. 2, for any successive group of wireless passcodes issued from a specific beacon, the major advertising value will be the same, and the minor advertising value will be different. Once the mobile communications device 25 receives the wireless passcode, it transmits the wireless passcode, or at least the major and minor advertising values contained in the wireless passcode, to the gaming authentication server 15. In various embodiments, the mobile communications device 25 also transmits the previously issued gaming authentication server session token to the gaming authentication server 15 as part of this process. The gaming authentication server 15 receives the wireless passcode and/or major and minor advertising values from the mobile communications device 15 as indicated by arrow 44. The transmission of the wireless passcode and/or advertising values from the mobile communications device to the gaming authentication server can be performed automatically by an application operating on the mobile communications device, or can be performed manually by a user of the mobile communications device.

Once the gaming authentication server 15 receives the wireless passcode and/or advertising values, the gaming authentication server 15 can then execute a validator program 19 to authenticate the mobile communications device for play. As part of this process, the gaming authentication server 15 can store a table that provides a shared secret key used by each beacon device. The gaming authentication server looks up the shared secret key from the shared secret table using the "major" value, which identifies the beacon that issued the wireless passcode, and determines a shared secret code as described. If the shared secret code matches the minor value of the wireless passcode, the gaming authentication server 15 marks the gaming authentication server session for the mobile communications device 25 as authenticated with a suitable expiry time. It then responds to the mobile application of the mobile communications device 25 as at arrow 45 in FIG. 3 with the expiry time-to-live and the mobile communications device is thus authenticated for gaming via the gaming engine 30 for a pre-determined time period. Revalidation after the pre-determined time period can occur in similar fashion, whereby the mobile communications device receives a wireless passcode from a beacon and transmits the wireless passcode to the gaming authentication server, whereupon the gaming authentication server compares a generated shared secret code associated with the beacon from which the passcode was received by the mobile communications device with the minor code element from the wireless passcode, and if there is a match, the mobile communications device is revalidated.

It will be appreciated that newly broadcasted wireless passcodes can be broadcasted for receipt by the mobile communications devices before the expiry of any previous authentication session, and further that the newly broadcasted wireless passcodes can be sent by the mobile communications devices and received by the gaming authentication server prior to the expiry of any previous authentication session. In this way, gaming activity for any given mobile communications device need not be interrupted as long as the given mobile communications device is still within the geo-fence of the regulated venue.

Generation of the shared secret code can occur according to methods such as (1) generating a key ("K") comprising an arbitrary byte string, (2) sharing the key securely with the beacon, (3) agreeing upon a start time ("T0") and an interval ("TI") to be used to calculate the value of a counter, (4) agreeing upon a cryptographic hash method ("H"), such as the SHA-1 algorithm, for example, and (5) agreeing upon a shared secret code length. Once the parameters are agreed upon, shared secret code generation can be as follows:

Calculate C as the number of times TI has elapsed after T0.

Compute the hash H with C as the message and K as the key. K can be passed as it is, C can be passed as a raw 64-bit unsigned integer.

Take the least 4 significant bits of H and use it as an offset, O.

Take 4 bytes from H starting at O bytes MSB, discard the most significant bit and store the rest as an (unsigned) 32-bit integer, I.

The shared secret code is the lowest N digits of I in base 10. If the result has fewer digits than N, pad it with zeroes from the left.

The beacon 20 computes the minor advertising value of the wireless passcode in the same way that the authentication server 15 determines the shared secret code. Some servers allow codes that should have been generated before or after the current time in order to account for slight clock skews, network latency and user delays.

FIG. 4 shows a schematic diagram illustrating how another process according to the present disclosure operates. As at 202, a mobile communications device in a regulated venue requests a UUID for the venue from the gaming authentication server, such as via a mobile app that communicates the user's geospatial location to the gaming authentication server with the request for the UUID. As at 204, the gaming authentication server receives the request, assesses the location of the mobile communications device, and responds with a UUID and associated beacon(s) in the appropriate venue via a communication to the mobile communications device. At 206, a beacon in the venue in proximity to the mobile communications device broadcasts a wireless passcode A, and at 208, the mobile communications device, which has received the wireless passcode A, transmits the wireless passcode A to the gaming authentication server. As described elsewhere herein, the wireless passcode A can include the UUID, a major advertising value designating the beacon that issued wireless passcode A, and a minor advertising value designating the value to be compared with the shared secret code determined by the gaming authentication server. The beacon broadcasting wireless passcode A continues to broadcast wireless passcode A for a predetermined amount of time, as indicated generally by arrow 207.

Upon receiving the wireless passcode A from the mobile communications device, the gaming authentication server authenticates the mobile communications device for play as at 210 for a pre-determined amount of time, indicated by box 240. This allows the mobile communications device to communicate back and forth with the gaming engine as indicated generally at 212 for the pre-determined time period.

In various embodiments as described elsewhere herein, the beacons within the venue periodically broadcast different wireless passcodes. Accordingly, as at 214, a beacon begins broadcasting wireless passcode B for time period 209. Notably, this broadcast is before the end of the pre-determined time period 240 for which the mobile communications device has been authenticated by the gaming authentication server, which helps prevent interruptions in a user's play based on not having a current wireless passcode. Once the mobile communications device receives and transmits wireless passcode B to gaming authentication server as at 216, the gaming authentication server can once again determine a shared secret code for comparing to the minor advertising value from wireless passcode B in order to authenticate the mobile communications device for continued play as at 218 for another pre-determined time period 242. As shown at 216 in FIG. 4, the second wireless passcode is received by the gaming authentication server at or before the end of the first pre-determined time period. In various embodiments, there can be an overlap 241 in the pre-determined time periods 240 and 242 so as to avoid interruption in user play. Further, in various embodiments, the mobile communications device app can seek new wireless passcode broadcasts at a time that is before the expiry of the current pre-determined time period.

It will be appreciated that, if the mobile communications device is moved around the venue during play, it may receive a subsequent wireless passcode that is not from the same beacon from which it received the first wireless passcode. Thus, while the mobile communications device received wireless passcode A from a first beacon in the present example, it may receive wireless passcode B from a different beacon to permit play beyond the first pre-determined time period 240. In such instance, it will be appreciated that wireless passcode B would have a different major advertising value in addition to the different minor advertising value from wireless passcode A. Regardless of which beacon issues wireless passcode B, the gaming authentication server can determine the appropriate shared secret code to authenticate the mobile communications device for play (indicated generally at 220) during pre-determined time period 242, as described elsewhere herein. It will be appreciated that the shared secret code for wireless passcode A is different from the shared secret code for wireless passcode B.

As at 222, a beacon issues wireless passcode C for time period 211. However, by way of example, if the mobile communications device has been taken out of the venue, such as to a parking lot adjacent the venue, the mobile communications device would not initially receive the wireless passcode C. In such example, the mobile communications device would cease being authenticated for play at the end of pre-determined time period 242, as indicated at 244. Nevertheless, upon re-entering the venue and receiving the current wireless passcode (e.g., wireless passcode C), the mobile communications device can send the wireless passcode C to the gaming authentication server as at 224, and can be authenticated by the gaming authentication server as at 226 for the pre-determined time period 246.

The presently disclosed system, apparatus and method can assist in preventing a brute force attack, such as where a bad actor attempts to send every possible TOTP value to the authentication server in order to force a valid session. As the major value is only two bytes in various embodiments, there may be only 65,536 different values. It is possible that the correct value could be guessed in the time before any given TOTP token would expire. In order to protect against brute force attacks, the gaming authentication server can store a count of incorrect attempts and after a designated number of failed attempts, the user can be locked out for a designated period of time.

Several safeguards are provided to detect and remedy situations where a bad actor attempts to remove a beacon to a new location. Inside a single regulated venue, there may be multiple beacon devices installed, both to provide sufficient coverage and to provide redundancy, should a single beacon fail. It would be expected that beacons placed near to each other should see a similar amount of traffic and this traffic will be monitored by the gaming authentication server. Should the gaming authentication server suddenly start seeing significantly fewer authentication requests from any single beacon, then an alert can be generated to have a staff member check the beacon location. The gaming authentication server can be configured to automatically suspend any beacons in this state, rejecting any authentication requests from such a beacon and instruct mobile device applications to no longer use that beacon for authentication requests.

A secondary safeguard provides for the mobile applications to only start looking for beacons once they know they are in the vicinity of a regulated venue. Should the user be at some other location, away from the regulated venue, then this first step would not return any beacon UUIDs for the mobile application. In this case, having a beacon in a non-regulated area would not be useful, as the user's mobile application would not be searching for it. Further, a bad actor would not be able to clone a beacon to operate as a "fake" beacon in a location of their choosing unless the actor knows the shared secret key that is used by both the beacon and the gaming authentication server for authentication. Each beacon has its own unique key and can be disabled by the gaming authentication server in case of beacon compromise. The key cannot be reverse engineered from the TOTP token. The beacon can be locked down such that only the services that are required are enabled. In addition, all WiFi and Ethernet access can be disabled meaning that the device cannot be compromised via remote access means.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combining a software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, JavaScrypt, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

What is claimed is:

1. A system, comprising:
   at least one beacon positioned within a venue, wherein the at least one beacon comprises a beacon processor and a beacon memory storing beacon instructions that, when executed by the beacon processor, cause the at least one beacon to:
      generate, on a periodic basis, a current wireless passcode comprising at least a first wireless passcode for a first predetermined time period and a second wireless passcode for a second predetermined time period after the first predetermined time period; and
      continually broadcast the current wireless passcode within the venue; and
   a gaming authentication server, comprising a gaming authentication server processor and a gaming authentication server memory storing gaming authentication server instructions that, when executed by the gaming authentication server processor, cause the gaming authentication server processor to:
      receive the current wireless passcode from a mobile communications device that has received the current wireless passcode from the at least one beacon;
      determine a shared secret code based on the current wireless passcode; and
      compare at least a portion of the current wireless passcode with the shared secret code and, upon at least the portion of the current wireless passcode matching the shared secret code, authenticate the mobile communications device for temporary gaming play within the venue.

2. The system of claim 1, wherein the second wireless passcode is different from the first wireless passcode.

3. The system of claim 1, wherein the current wireless passcode comprises at least a major advertising value and a minor advertising value, and wherein the major advertising value identifies the at least one beacon.

4. The system of claim 3, wherein the gaming authentication server instructions further cause the gaming authentication server processor to compare the minor advertising value of the current wireless passcode with the shared secret code.

5. The system of claim 3, wherein the minor advertising value of the second wireless passcode is different from the minor advertising value of the first wireless passcode, and wherein the major advertising value of the second wireless passcode is the same as the major advertising value of the first wireless passcode.

6. The system of claim 3, wherein the minor advertising value of the second wireless passcode is different from the minor advertising value of the first wireless passcode, and wherein the major advertising value of the second wireless passcode is different from the major advertising value of the first wireless passcode.

7. The system of claim 1, wherein the gaming authentication server instructions further cause the gaming authentication server processor to:
   receive a request for a unique identifier for the at least one beacon from the mobile communications device; and
   issue the unique identifier for the at least one beacon to the mobile communications device.

8. The system of claim 1, wherein the at least one beacon is not in communication with the gaming authentication server.

9. A method, comprising:
   receiving, by a gaming authentication server from a mobile communications device, a request for a unique identifier for at least one beacon within a venue;
   issuing, from the gaming authentication server to the mobile communications device, the unique identifier for the at least one beacon within the venue;
   issuing, by the at least one beacon, a first wireless passcode receivable by the mobile communications device, wherein the first wireless passcode comprises at least a first major advertising value and a first minor advertising value;
   receiving, by the gaming authentication server from the mobile communications device, the first major advertising value and the first minor advertising value;
   authenticating, by the gaming authentication server, the mobile communications device for gaming for a first pre-determined time period based on the received first major advertising value and first minor advertising value.

10. The method of claim 9, wherein receiving the request for a unique identifier by the gaming authentication server comprises receiving geolocation data from the mobile communications device.

11. The method of claim 9, wherein authenticating the mobile communications device comprises identifying, by the gaming authentication server, the at least one beacon based upon the received first major advertising value and comparing the received first minor advertising value with a shared secret code determined by the gaming authentication server for the at least one beacon.

12. The method of claim 9, further comprising:
   issuing, by the at least one beacon, a second wireless passcode receivable by the at least one mobile communications device;
   receiving, by the gaming authentication server from the mobile communications device, the second wireless passcode; and
   authenticating, by the gaming authentication server, the mobile communications device for gaming via the gaming authentication server for a second pre-determined time period extending past the first pre-determined time period, based on the received second wireless passcode.

13. The method of claim 12, wherein the second wireless passcode is issued by the at least one beacon at or before the end of the first pre-determined time period.

14. The method of claim 12, wherein the second wireless passcode is received by the gaming authentication server at or before the end of the first pre-determined time period.

15. The method of claim 12, wherein the second wireless passcode comprises a second major advertising value and a second minor advertising value, and wherein at least the second minor advertising value is different from the first minor advertising value.

16. The method of claim 9, wherein the at least one beacon is not in communication with the gaming authentication server.

17. A gaming authentication server, comprising:
a processor;
a memory storing instructions that, when executed by the processor, cause the processor to perform operations comprising:
receiving a request from a mobile communications device for a unique identifier for at least one beacon broadcasting a periodically changing wireless passcode within a venue;
issuing, to the mobile communications device, the unique identifier for the at least one beacon;
receiving, from the mobile communications device, a wireless passcode received by the mobile communications device from the at least one beacon;
determining a shared secret code corresponding to at least a portion of the wireless passcode;
comparing the shared secret code with at least the portion of the wireless passcode; and
upon the shared secret code matching at least the portion of the wireless passcode, authenticating the mobile communications device for temporary gaming play.

18. The gaming authentication server of claim 17, wherein the wireless passcode comprises a major advertising value and a minor advertising value, and wherein the major advertising value identifies the at least one beacon.

19. The gaming authentication server of claim 18, wherein the instructions further cause the processor to compare the minor advertising value of the wireless passcode with the shared secret code.

20. The gaming authentication server of claim 19, wherein the determined shared secret code periodically changes.

* * * * *